(12) United States Patent
Estenfelder et al.

(10) Patent No.: US 8,097,558 B2
(45) Date of Patent: *Jan. 17, 2012

(54) CATALYST AND METHOD FOR PRODUCING PHTHALIC ANHYDRIDE

(75) Inventors: Marvin Estenfelder, Karlsruhe (DE); Helmut Hartsberger, München (DE); Christian Gückel, Grafting (DE)

(73) Assignee: Sud-Chemie AG, Munich (DE)

( * ) Notice: Subject to any disclaimer, the term of this patent is extended or adjusted under 35 U.S.C. 154(b) by 950 days.

This patent is subject to a terminal disclaimer.

(21) Appl. No.: 11/597,495

(22) PCT Filed: May 22, 2005

(86) PCT No.: PCT/EP2005/005546
§ 371 (c)(1),
(2), (4) Date: Jan. 2, 2008

(87) PCT Pub. No.: WO2005/115615
PCT Pub. Date: Dec. 8, 2005

(65) Prior Publication Data
US 2008/0207924 A1 Aug. 28, 2008

(30) Foreign Application Priority Data

May 29, 2004 (DE) .......................... 10 2004 026 471

(51) Int. Cl.
*C07D 307/89* (2006.01)
*B01J 23/00* (2006.01)
(52) U.S. Cl. .................. 502/350; 549/248; 549/249
(58) Field of Classification Search .................. 502/350; 549/248, 249
See application file for complete search history.

(56) References Cited

U.S. PATENT DOCUMENTS

| | | | |
|---|---|---|---|
| 2,035,606 A | 3/1936 | Jaeger | |
| 2,142,678 A | 1/1939 | Porter | |
| 3,684,741 A | 8/1972 | Friedrichsen | |
| 3,799,886 A | 3/1974 | Felice | |
| 3,830,755 A | 8/1974 | Reuter | |
| 3,926,846 A | 12/1975 | Ono | |
| 4,405,505 A | 9/1983 | Neri | |
| 4,489,204 A | 12/1984 | Neri | |
| 5,169,820 A * | 12/1992 | Ueda et al. .................. 502/209 |
| 5,235,071 A | 8/1993 | Ueda | |
| 5,677,261 A | 10/1997 | Tenten | |
| 5,792,719 A | 8/1998 | Eberle | |
| 5,841,009 A | 11/1998 | Carmello et al. | |
| 5,969,160 A | 10/1999 | Lindstrom | |
| 6,288,273 B1 | 9/2001 | Heidemann | |
| 6,362,345 B1 | 3/2002 | Heidemann | |
| 6,458,970 B1 | 10/2002 | Hefele | |
| 6,586,361 B1 | 7/2003 | Heidemann | |
| 6,700,000 B1 | 3/2004 | Heidemann | |
| 6,774,246 B2 | 8/2004 | Reuter | |
| 7,151,184 B2 | 12/2006 | Storck | |
| 7,390,911 B2 | 6/2008 | Neto | |
| 7,618,918 B2 * | 11/2009 | Estenfelder et al. .......... 502/350 |
| 2006/0276661 A1 | 12/2006 | Storck | |
| 2007/0060758 A1 | 3/2007 | Storck | |
| 2007/0066836 A1 | 3/2007 | Neto | |
| 2007/0093384 A1 | 4/2007 | Storck | |
| 2008/0064594 A1 | 3/2008 | Neto | |

FOREIGN PATENT DOCUMENTS

| | | |
|---|---|---|
| DE | 1642938 | 5/1971 |
| DE | 2005969 | 8/1971 |
| DE | 19709589 | 9/1998 |
| EP | 0099431 A1 | 2/1984 |
| EP | 0286448 | 10/1988 |
| EP | 0522871 | 1/1993 |
| EP | 0676400 | 4/1995 |
| EP | 0985648 | 3/2000 |
| GB | 2298197 A | 8/1996 |
| WO | WO2005115615 | 12/2005 |
| WO | WO2005115616 | 12/2005 |

OTHER PUBLICATIONS

Towae, et al., "Phthalic Acid and Derivatives", Ullmann's Encyclopedia of Industrial Chemistry, vol. A20, 1992, pp. 181-211.
DE102004026471.
English translation of International Preliminary Report on Patentability pertaining to international application No. PCT/EP2005/012703. See reference to U.S. Appl. No. 11/914,147 in the Information Disclosure Statement filed on Jan. 4, 2008.
English translation of International Preliminary Report on Patentability pertaining to international application No. PCT/EP2006/001915. See reference to U.S. Appl. No. 11/817,428 in the Information Disclosure Statement filed on Jan. 4, 2008. This application may contain information material to the patentability of the current application.
Sadhukhan, P., et al., "Oxidation of Naphthalene in Packed-Bed Reactor with Catalyst Activity Profile: A Design Scheme for Improved Reactor Stability and Higher Product Yield", AIChE Journal, vol. 22, No. 4, 1976, pp. 808-810.
Office Action dated Oct. 9, 2008 with respect to U.S. Appl. No. 11/817,428, a "potentially related" application disclosed in an Information Disclosure Statement filed on Dec. 18, 2007.
Office Action dated Oct. 20, 2008 with respect to U.S. Appl. No. 11/817,362, a "potentially related" application disclosed in an Information Disclosure Statement filed on Dec. 18, 2007.

(Continued)

Primary Examiner — Taylor Victor Oh
(74) Attorney, Agent, or Firm — Scott R. Cox

(57) ABSTRACT

The present invention relates to a catalyst, in particular for the preparation of phthalic anhydride by gas phase oxidation of o-xylene and/or naphthalene, having an inert support and at least one layer which has been applied thereto and has a catalytically active composition comprising $TiO_2$, characterized in that at least a portion of the $TiO_2$ used has the following properties: (a) the BET surface area is more than 15 m²/g, (b) at least 25% of the total pore volume is formed by pores having a radius between 60 and 400 nm, and (c) the primary crystal size is more than 22 ångstrøm. Also described is a preferred process for preparing such a catalyst, and the preferred use of the titanium dioxide used in accordance with the invention.

37 Claims, No Drawings

OTHER PUBLICATIONS

Office Action dated Sep. 23, 2008 with respect to U.S. Appl. No. 11/575,789, a "potentially related" application disclosed in an Information Disclosure Statement filed on Dec. 18, 2007.

Amendment filed Jan. 8, 2009 in response to Office Action dated Oct. 9, 2008 with respect to U.S. Appl. No. 11/817,428, a "potentially related" application disclosed in an Information Disclosure Statement filed on Jan. 4, 2008.

Amendment filed Dec. 22, 2008 in response to Office Action dated Sep. 23, 2008 with respect to U.S. Appl. No. 11/575,789, a "potentially related" application disclosed in an Information Disclosure Statement filed on Jan. 4, 2008.

Amendment filed Jan. 20, 2009 in response to Office Action dated Oct. 20, 2008 with respect to U.S. Appl. No. 11/817,362, a "potentially related" application disclosed in an Information Disclosure Statement filed on Jan. 4, 2008.

Office Action dated Mar. 9, 2009 with respect to U.S. Appl. No. 11/575,789.

Office Action dated Mar. 10, 2009 with respect to U.S. Appl. No. 11/817,428.

Office Action dated Mar. 23, 2009 with respect to U.S. Appl. No. 11/817,362.

Response filed May 27, 2009 to Office Action dated Mar. 9, 2009 with respect to U.S. Appl. No. 11/575,789, a "potentially related" application disclosed in an Information Disclosure Statement filed on Jan. 7, 2008.

Response filed May 20, 2009 to Office Action dated Mar. 10, 2009 with respect to U.S. Appl. No. 11/817,428, a "potentially related" application disclosed in an Information Disclosure Statement filed on Jan. 7, 2008.

Response filed May 26, 2009 to Office Action dated Mar. 23, 2009 with respect to U.S. Appl. No. 11/817,362, a "potentially related" application disclosed in an Information Disclosure Statement filed on Jan. 7, 2008.

Office Action dated May 24, 2010 with respect to U.S. Appl. No. 11/914,147, a "potentially related" application.

Amendment dated Oct. 13, 2010 filed in response to Office Action dated May 24, 2010 with respect to U.S. Appl. No. 11/914,147, a "potentially related" application.

Office Action dated Dec. 14, 2010 with respect to U.S. Appl. No. 11/914,147, a "potentially related" application.

\* cited by examiner

CATALYST AND METHOD FOR PRODUCING PHTHALIC ANHYDRIDE

The invention relates to a catalyst, in particular for the preparation of phthalic anhydride (PA) by gas phase oxidation of o-xylene and/or naphthalene, the catalytically active composition of the catalyst comprising titanium dioxide having particular properties.

The industrial-scale preparation of phthalic anhydride is achieved by the catalytic gas phase oxidation of o-xylene and/or naphthalene. For this purpose, a catalyst suitable for the reaction is charged into a reactor, preferably what is known as a tube bundle reactor in which a multitude of tubes are arranged in parallel, and flowed through from the top or bottom with a mixture of the hydrocarbon(s) and an oxygenous gas, for example air. Owing to the intense heat formation of such oxidation reactions, it is necessary for a heat carrier medium to flow around the reaction tubes to prevent what are known as hotspots, and thus to remove the amount of heat formed. This energy can be utilized for the production of steam. The heat carrier medium used is generally a salt melt and here preferably a eutectic mixture of $NaNO_2$ and $KNO_3$.

To suppress the unwanted hotspots, it is likewise possible to charge a structured catalyst into the reaction tube, which can give rise, for example, to two or three catalyst zones composed of catalysts of different composition. Such systems are already known as such from EP 1 082 317 B1 or EP 1 084 115 B1.

The layer-by-layer arrangement of the catalysts also has the purpose of keeping the content of undesired by-products, i.e. compounds which are before the actual product of value in a possible reaction mechanism from o-xylene and/or naphthalene to phthalic anhydride, in the crude PA as low as possible. These undesired by-products include mainly the compounds o-tolylaldehyde and phthalide. The further oxidation of these compounds to phthalic anhydride additionally increases the selectivity with regard to the actual product of value.

In addition to the above-addressed under-oxidation products, over-oxidation products also occur in the reaction. These include maleic anhydride, citraconic anhydride, benzoic acid and the carbon oxides. Selective suppression of the formation of these undesired by-products in favour of the product of value leads to a further rise in the productivity and economic viability of the catalyst.

There is constant need for catalysts which enable an increase in productivity and economic viability.

It is therefore an object of the present invention to develop a catalyst or a catalyst system which avoids the disadvantages of known catalysts from the prior art and enables an improvement in the activity, selectivity and/or lifetime of the catalyst.

This object is achieved by a catalyst according to Claim 1. Accordingly, a first aspect of the invention relates to a catalyst, in particular for the preparation of phthalic anhydride by gas phase oxidation of o-xylene and/or naphthalene, having an inert support and at least one layer which has been applied thereto and has a catalytically active composition comprising $TiO_2$, characterized in that at least a portion of the $TiO_2$ used has the following properties: (a) the BET surface area is more than 15 $m^2/g$, (b) at least 25% of the total pore volume is formed by pores having a radius between 60 and 400 nm, and (c) the primary crystal size is more than 22 ångstrøm. Preferred embodiments are specified in the subclaims.

It is assumed, without any restriction of the invention to the correctness of this theoretical assumption, that the use of the titanium dioxide having the properties described here in a catalyst can result in particularly advantageous reaction spaces being achieved for the desired reactions, in particular within the pore structure. At the same time, when the inventive $TiO_2$ matrix is used, advantageous access routes for the reactants to the reactive sites on the surface of the $TiO_2$ matrix, and also escape routes for the reaction products, are provided.

An essential feature of the present invention is the use of a specific titanium dioxide which is notable for a comparatively high BET surface area of more than 15 $m^2/g$, in particular between about 15 and 60 $m^2/g$.

In a first aspect of the present invention, it has been found that, surprisingly, when titanium dioxide in which at least 25%, in particular at least about 40%, more preferably at least about 50%, most preferably at least about 60%, of the total pore volume is formed by pores having a radius between 60 and 400 nm is used, particularly advantageous catalysts can be obtained.

In a further aspect of the present invention, $TiO_2$ is used which has a primary crystal size (primary particle size) of more than about 22 ångstrøm, preferably more than about 25 ångstrøm, more preferably at least 27 ångstrøm, in particular at least about 30 ångstrøm. Thus, it has been found that those $TiO_2$ primary crystals having the aforementioned (minimum) size enable the preparation of particularly advantageous catalysts. The primary crystal size is preferably below 80 ångstrøm, in particular below 50 ångstrøm. The aforementioned primary crystal size apparently enables, without a restriction of the invention to this assumption, the formation of a not excessively compact, but rather open-pored structure of the titanium dioxide in the catalyst. One process for determining the primary crystal size is specified in the method section which follows. In a further aspect of the invention, it has also been found that the compliance with the aforementioned primary crystal size in at least a portion of the titanium dioxide used for the catalyst preparation in itself (i.e. without compliance with the aforementioned pore radius distribution) already provides surprisingly good results, even though the simultaneous compliance with the above-defined pore radius distribution is preferred in accordance with the invention.

In a further aspect of the present invention, $TiO_2$ is used which has a bulk density of less than 1.0 g/ml, in particular less than 0.8 g/ml, more preferably less than about 0.6 g/ml. Most preferred are $TiO_2$ materials having a bulk density of not more than about 0.55 g/ml. One process for determining the bulk density is specified in the method section which follows. It has thus been found that the use of titanium dioxide having a bulk density as defined above enables the preparation of particularly high-performance catalysts. It is assumed, without a restriction of the invention thereto, that the bulk density here is a measure of a particularly favourable structure of the $TiO_2$ surface made available in the catalyst, and the loose, not excessively compact structure provides particularly favourable reaction spaces and access and escape routes for the reactants and reaction products respectively. In a particularly preferred inventive embodiment, the titanium dioxide used will thus, in addition to the pore radius distribution described herein and the primary crystal size, also have the bulk density defined herein. In a further aspect of the invention, it has, however, also been found that a material which, irrespective of the pore radius distribution described herein and the primary crystal size, complies with the above-defined bulk density unexpectedly already has better results than comparative materials having a higher bulk density.

In yet a further aspect of the present invention, the primary crystals of the titanium dioxide used are at least partly combined to form agglomerates which can be recognized readily, for example, in electron micrographs. When they are open-pored, in particular "sponge-like", agglomerates, the preferred, not excessively compact, porous structure of the titanium dioxide is favoured. In a preferred inventive embodiment, the primary crystals of the $TiO_2$ are combined to an extent of more than 30%, in particular more than 50%, to form agglomerates, in particular open-pored agglomerates.

In a particularly preferred embodiment of the present invention, the $TiO_2$-containing catalyst is used for the gas phase oxidation of hydrocarbons. Especially preferred is use for preparing phthalic anhydride by gas phase oxidation of o-xylene, naphthalene or mixtures thereof. However, a multitude of other catalytic gas phase oxidations of aromatic hydrocarbons such as benzene, xylenes, naphthalene, toluene or durene for the preparation of carboxylic acids and/or carboxylic anhydrides are also known in the prior art. These afford, for example, benzoic acid, maleic anhydride, phthalic anhydride, isophthalic acid, terephthalic acid or pyromellitic anhydride. It is also possible in such reactions to use the inventive catalyst.

In general, in the reaction, a mixture of a molecular oxygen-containing gas, for example air, and the starting material to be oxidized is passed through a fixed bed reactor, in particular a tube bundle reactor, which can consist of a multitude of tubes arranged in parallel. In the reactor tubes is disposed in each case a bed composed of at least one catalyst. The preferences for a bed composed of a plurality of (different) catalyst zones have already been addressed above.

When the inventive catalysts are used for the preparation of phthalic anhydride by gas phase oxidation of o-xylene and/or naphthalene, it has been found that, surprisingly, the inventive catalysts afford a high activity with simultaneously low formation of the undesired by-products $CO_x$, i.e. $CO_2$ and CO. In addition, a very good $C_8$ and PA selectivity is found, as the result of which the productivity of the catalyst is increased. In many cases, the high $C_8$ selectivity and the low $CO_x$ selectivity of the inventive catalysts in particular will also be of interest. The low $CO_x$ selectivity also results in an advantageous manner in lower heat evolution and also lower hotspot temperatures. This results in there being slower deactivation of the catalyst in the hotspot region.

In a preferred inventive embodiment, the $TiO_2$ used has a BET surface area (DIN 66131) between about 15 and 45 $m^2/g$, in particular between about 15 and 30 $m^2/g$.

It is further preferred that up to 80%, in particular up to 75%, more preferably up to 70%, of the total pore volume is formed by pores having a radius between 60 and 400 nm.

The pore volumes and fractions specified herein are determined, unless stated otherwise, by means of mercury porosimetry (to DIN 66133). The total pore volume stated relates in the present description in each case to the total pore volume, measured by means of mercury porosimetry, between 7500 and 3.7 nm pore radius size.

Pores having a radius of more than 400 nm constitute preferably fewer than about 30%, in particular fewer than about 22%, more preferably fewer than 20%, of the total pore volume of the $TiO_2$ used.

It is further preferred that about 50 to 75%, in particular about 50 to 70%, more preferably about 50 to 65%, of the total pore volume of the $TiO_2$ is formed by pores having a radius of 60 to 400 nm, and preferably about 15 to 25% of the total pore volume is formed by pores having a radius of more than 400 nm.

With regard to the smaller pore radii, it is preferred that less than 30%, in particular less than 20%, of the total pore volume of the titanium dioxide is formed by pores having a radius of 3.7 to 60 nm. For this pore size, a range which is particularly preferred here is about 10 to 30% of the total pore volume, in particular 12 to 20%.

In a further preferred embodiment, the $TiO_2$ used has the following particle size distribution: the $D_{10}$ value is preferably 0.5 µm or lower; the $D_{50}$ value (i.e. the value at which in each case half of the particles have a greater and smaller particle diameter) is preferably 1.5 µm or below; the $D_{90}$ value is preferably 4 µm or below. The $D_{90}$ value of the $TiO_2$ used is preferably between about 0.5 and 20 µm, in particular between about 1 and 10 µm, more preferably between about 2 and 5 µm. The titanium dioxide is preferably in the anatase form.

Depending on the intended use of the inventive catalyst, the components which are familiar and customary to those skilled in the art may be present in addition to the $TiO_2$ used in accordance with the invention in the active composition of the catalyst. In one possible inventive embodiment, it is also possible for only a portion of the titanium dioxide used for the catalyst preparation to have the properties described herein, although this is generally not preferred. The shape of the catalyst and its homogeneous or heterogeneous structure is also in principle not restricted in the context of the present invention and may include any embodiment which is familiar to those skilled in the art and appears to be suitable for the particular field of application.

When the inventive catalyst is used, in a particularly preferred embodiment, for the preparation of phthalic anhydride, useful catalysts have been found to be what are known as coated catalysts. In these catalysts, a support which is inert under the reaction conditions, for example composed of quartz ($SiO_2$), porcelain, magnesium oxide, tin dioxide, silicon carbide, rutile, clay earth ($Al_2O_3$), aluminium silicate, magnesium silicate (steatite), zirconium silicate or cerium silicate, or composed of mixtures of the aforementioned materials, is used. The support may, for example, have the shape of rings, spheres, shells or hollow cylinders. To this is applied, in comparatively thin layers (shells), the catalytically active composition. It is also possible to apply two or more layers of the catalytically active composition having the same or different compositions.

With regard to the further components of the catalytically active composition of the inventive catalyst (in addition to $TiO_2$), it is possible in principle to make reference to the compositions and components which have been described in the relevant prior art and are familiar to those skilled in the art. These are mainly catalyst systems which, in addition to titanium oxide(s), comprise oxides of vanadium. Such catalysts are described, for example, in EP 0 964 744 B1, whose disclosure on this subject is incorporated explicitly by reference into the description.

In particular, the prior art describes a series of promoters for increasing the productivity of the catalysts, which may likewise be used in the inventive catalyst. These include the alkali metals and alkaline earth metals, thallium, antimony, phosphorus, iron, niobium, cobalt, molybdenum, silver, tungsten, tin, lead and/or bismuth, and mixtures of two or more of the aforementioned components. For example, DE 21 59 441 A describes a catalyst which, in addition to titanium dioxide of the anatase modification, consists of 1 to 30% by weight of vanadium pentoxide and zirconium dioxide. It is possible via the individual promoters to influence the activity and selectivity of the catalysts, in particular by lowering or increasing the activity. The selectivity-increasing promoters include, for example, the alkali metal oxides, whereas oxidic phosphorus compounds, in particular phosphorus pentoxide, increase the activity of the catalyst at the cost of the selectivity.

For the preparation of the inventive catalysts, the prior art describes numerous suitable processes, so that a detailed illustration is in principle not required here. For the preparation of coated catalysts, reference can be made, for example, to the process described in DE-A-16 42 938 or DE-A 17 69 998, in which a solution or suspension, comprising an aqueous and/or an organic solvent, of the components of the catalytically active composition and/or precursor compounds thereof (frequently referred to as "slurry") is sprayed onto the support material in a heated coating drum at elevated temperature until the desired content of catalytically active composition, based on the total catalyst weight, has been attained. It is also possible, according to DE 21 06 796, to carry out the application (coating) of the catalytically active composition to the inert support in fluidized bed coaters.

Preference is given to preparing coated catalysts by the application of a thin layer of 50 to 500 µm of the active components to an inert support (for example U.S. Pat. No. 2,035,606). Useful supports have been found to be in particular spheres or hollow cylinders. These shaped bodies give rise to a high packing density at low pressure drop and reduce the risk of formation of packing faults when the catalyst is charged into the reaction tubes.

The melted and sintered shaped bodies have to be heat-resistant within the temperature range of the reaction as it proceeds. As detailed above, useful substances are, for example, silicon carbide, steatite, quartz, porcelain, $SiO_2$, $Al_2O_3$ or clay earth.

The advantage of the coating of support bodies in a fluidized bed is the high uniformity of the layer thickness, which plays a crucial role for the catalytic performance of the catalyst. A particularly uniform coating is obtained by spraying a suspension or solution of the active components onto the heated support at from 80 to 200° C. in a fluidized bed, for example according to DE 12 80 756, DE 198 28 583 or DE 197 09 589. In contrast to the coating in coating drums, it is also possible, when hollow cylinders are used as a support in the fluidized bed processes mentioned, to uniformly coat the interior of the hollow cylinders. Among the abovementioned fluidized bed processes, the process according to DE 197 09 589 in particular is advantageous, since the predominantly horizontal, circular motion of the supports, in addition to uniform coating, also achieves low abrasion of apparatus parts.

For the coating operation, the aqueous solution or suspension of the active components and of an organic binder, preferably a copolymer of vinyl acetate/vinyl laurate, vinyl acetate/ethylene or styrene/acrylate, is sprayed via one or more nozzles onto the heated, fluidized support. It is particularly favourable to introduce the spray liquid at the point of highest product speed, as the result of which the sprayed substance can be distributed uniformly in the bed. The spray operation is continued until either the suspension has been consumed or the required amount of active components has been applied to the support.

In a particularly preferred inventive embodiment, the catalytically active composition of the inventive catalyst, comprising the $TiO_2$ as defined herein, is applied in a fluidized bed with the aid of suitable binders, so that a coated catalyst is obtained. Suitable binders include organic binders familiar to those skilled in the art, preferably copolymers, advantageously in the form of an aqueous dispersion, of vinyl acetate/vinyl laurate, vinyl acetate/acrylate, styrene/acrylate, vinyl acetate/maleate and vinyl acetate/ethylene. Particular preference is given to using an organic polymeric or copolymeric adhesive, in particular a vinyl acetate copolymer adhesive, as the binder. The binder used is added in customary amounts to the catalytically active composition, for example at about 10 to 20% by weight based on the solids content of the catalytically active composition. For example, reference can be made to EP 744 214. When the catalytically active composition is applied at elevated temperatures of about 150° C., an application to the support without organic binders, as is known from the prior art, is also possible. Coating temperatures which can be used when the above-specified binders are used are, according to DE 21 06 796, for example, between about 50 and 450° C. The binders used burn off within a short time in the course of baking-out of the catalyst when the charged reactor is put into operation. The binders serve primarily to reinforce the adhesion of the catalytically active composition on the support and to reduce attrition in the course of transport and charging of the catalyst.

Further possible processes for preparing coated catalysts for the catalytic gas phase oxidation of aromatic hydrocarbons to carboxylic acids and/or carboxylic anhydrides have been described, for example, in WO 98/00778 and EP-A 714 700. According to these, from a solution and/or a suspension of the catalytically active metal oxides and/or their precursor compounds, optionally in the presence of assistants for the catalyst preparation, a powder is prepared initially and is subsequently, for the catalyst preparation on the support, optionally after conditioning and also optionally after heat treatment to generate the catalytically active metal oxides, applied in coating form, and the support coated in this way is subjected to a heat treatment to generate the catalytically active metal oxides or to a treatment to remove volatile constituents.

Suitable conditions for carrying out a process for the gas phase oxidation of hydrocarbons, in particular for the preparation of phthalic anhydride from o-xylene and/or naphthalene, are likewise known to those skilled in the art from the prior art. In particular, reference is made to the comprehensive description in K. Towae, W. Enke, R. Jäckh, N. Bhargana "Phthalic Acid and Derivatives" in Ullmann's Encyclopedia of Industrial Chemistry Vol. A. 20, 1992, 181 and this is incorporated by reference. For example, the boundary conditions known from the aforementioned reference, WO-A 98/37967 or WO 99/61433 may be selected for the steady operating state of the oxidation.

To this end, the catalysts are initially charged into the reaction tubes of the reactor which are thermostatted externally to the reaction temperature, for example by means of salt melts. The reaction gas is passed through the thus prepared catalyst bed at temperatures of generally from 300 to 450° C., preferably from 320 to 420° C., and more preferably from 340 to 400° C., and at an elevated pressure of generally from 0.1 to 2.5 bar, preferably from 0.3 to 1.5 bar, at a space velocity of generally from 750 to 5000 $h^{-1}$.

The reaction gas fed to the catalyst is generally obtained by mixing a molecular oxygen-containing gas which, apart from oxygen, may also comprise suitable reaction moderators and/or diluents, such as steam, carbon dioxide and/or nitrogen, with the aromatic hydrocarbon to be oxidized, and the molecular oxygen-containing gas may generally contain 1 to 100 mol %, preferably 2 to 50 mol % and more preferably 10 to 30 mol %, of oxygen, 0 to 30 mol %, preferably 0 to 10 mol %, of steam, and 0 to 50 mol %, preferably 0 to 1 mol %, of carbon dioxide, remainder nitrogen. To obtain the reaction gas, the molecular oxygen-containing gas is generally charged with 30 to 150 g per $m^3$ (STP) of gas of the aromatic hydrocarbon to be oxidized.

In a particularly preferred inventive embodiment, the inventive catalyst has an active composition content between about 7 and 12% by weight, in particular between 8 and 10% by weight, the active composition (catalytically active composition) containing between 5 and 15% by weight of $V_2O_5$, 0 and 4% by weight of $Sb_2O_3$, 0.2 and 0.75% by weight of Cs, 0 and 3% by weight of $Nb_2O_5$ and the remainder of $TiO_2$. Such an inventive catalyst may be used as such, or, for example, in the case of a two-zone or multizone catalyst, as a first catalyst zone disposed toward the gas inlet side.

In a particularly preferred inventive embodiment, the BET surface area of the catalyst is between 15 and about 25 $m^2/g$. It is further preferred that such a first catalyst zone has a length fraction of about 40 to 60% of the total length of all catalyst zones present (total length of the catalyst bed present).

In a further preferred inventive embodiment, the inventive catalyst has an active composition content of about 6 to 11% by weight, in particular 7 to 9% by weight, the active composition containing 5 to 15% by weight of $V_2O_5$, 0 to 4% by weight of $Sb_2O_3$, 0.05 to 0.3% by weight of Cs, 0 to 2% by weight of $Nb_2O_5$ and the remainder of $TiO_2$. Such an inventive catalyst may, for example, be used as the second catalyst zone, i.e. downstream of the first catalyst zone disposed toward the gas inlet side (cf. above). It is preferred that the catalyst has a BET surface area between about 15 and 25 $m^2/g$. It is further preferred that this second zone has a length fraction of about 10 to 30% of the total length of all catalyst zones present.

In a further inventive embodiment, the inventive catalyst has an active composition content between about 5 and 10% by weight, in particular between 6 and 8% by weight, the active composition (catalytically active composition) containing 5 to 15% by weight of $V_2O_5$, 0 to 4% by weight of $Sb_2O_3$, 0 to 0.1% by weight of Cs, 0 to 1% by weight of $Nb_2O_5$ and the remainder of $TiO_2$. Such an inventive catalyst may be used, for example, as the third catalyst zone disposed downstream of the above-described second catalyst zone. Preference is given to a BET surface area of the catalyst which is somewhat higher than that of the layers disposed closer to the gas inlet side, in particular in the range between about 25 to about 45 $m^2/g$. It is further preferred that such a third catalyst zone has a length fraction of about 10 to 50% of the total length of all catalyst zones present.

It has also been found that, surprisingly, the inventive multizone or multilayer catalysts, in particular having three or more layers, can be used particularly advantageously when the individual catalyst zones are present in a certain length ratio relative to one another.

Thus, in a particularly preferred inventive embodiment, the first catalyst zone disposed toward the gas inlet side has a length fraction, based on the total length of the catalyst bed, of at least 40%, in particular at least 45%, more preferably at least 50%. It is especially preferred that the proportion of the first catalyst zone in the total length of the catalyst bed is between 40 and 70%, in particular between 40 and 55%, more preferably between 40 and 52%.

The second zone takes up preferably about 10 to 40%, in particular about 10 to 30%, of the total length of the catalyst bed. It has also been found that, surprisingly, a ratio of the length of the third catalyst zone to the length of the second catalyst zone of between about 1 and 2, in particular between 1.2 and 1.7, more preferably between 1.3 and 1.6, provides particularly good results with regard to the economic viability such as the efficiency of raw material utilization and productivity of the catalyst.

It has been found that the aforementioned selection of the length fractions of the individual catalyst zones enables particularly advantageous positioning of the hotspot, in particular in the first zone, and good temperature control for the prevention of excessively high hotspot temperatures even in the case of prolonged operating time of the catalyst. This improves the yield, in particular based on the lifetime of the catalyst. It is assumed, without the invention being restricted to this assumption, that the aforementioned zone length ratio of the individual catalyst zones relative to one another results in virtually full conversion of the o-xylene used actually within the second catalyst zone and thus, in the third catalyst zone with the advantages described above, in what is known as "product polishing", i.e. the cleaning of the reaction gas to free it of undesired by-products by oxidation to the actual product of value. In addition, it is known to those skilled in the art that, after a certain running time, such catalysts deactivate in the region of the hotspot (generally in the first zone). This deactivation results in a shifting of the reaction into the second, more active zone, which leads to very high hotspot temperatures and the associated problems in relation to selectivity and plant safety. The zone ratios selected in the inventive catalyst, in particular of the first zone, ensure a maximum residence time of the hotspot in the first zone with the known advantages, and the inventive length of the second and third zone at the same time ensures a minimum proportion of undesired by-products with simultaneously maximum yield of actual product of value.

The temperature management in the gas phase oxidation of o-xylene to phthalic anhydride is sufficiently well known to those skilled in the art from the prior art, and reference can be made, for example, to DE 100 40 827 A1.

It is further preferred in accordance with the invention that, when the inventive catalyst is used in a multizone catalyst bed, the content of alkali metals in the catalyst zones falls from the gas inlet side toward the gas outlet side.

It has also been found that, surprisingly, particularly favourable three-zone or multizone catalysts can be obtained in many cases when the active composition content decreases from the first catalyst zone disposed toward the gas inlet side to the catalyst zone disposed toward the gas outlet side. It has been found to be advantageous that the first catalyst zone has an active composition content between about 7 and 12% by weight, in particular between about 8 and 11% by weight, the second catalyst zone has an active composition content between about 6 and 11% by weight, in particular between about 7 and 10% by weight, and the third catalyst zone has an active composition content between about 5 and 10% by weight, in particular between about 6 and 9% by weight.

The terms first, second and third catalyst zone are used in conjunction with the present invention as follows: the first catalyst zone refers to the catalyst zone disposed toward the gas inlet side. Toward the gas outlet side, another two further catalyst zones are present in the inventive catalyst, which are referred to as the second and third catalyst zone. The third catalyst zone is closer to the gas outlet side than the second catalyst zone.

In a particularly preferred inventive embodiment, the inventive catalyst has three catalyst zones. In that case, the third catalyst zone is at the gas outlet side. The presence of additional catalyst zones upstream of the first catalyst zone in the gas flow is, however, not ruled out. For example, in one inventive embodiment, the third catalyst zone as defined herein may be followed by another fourth catalyst zone (having an active composition content equal to or even lower than the third catalyst zone).

According to the invention, the active composition content between the first and the second catalyst zone and/or between the second and the third catalyst zone may decrease.

In a particularly preferred inventive embodiment, the active composition content decreases between the second and the third catalyst zone. It goes without saying that the active composition content never increases in the sequence of the catalyst zones from the gas inlet side to the gas outlet side, but at worst remains the same.

It is assumed, without the invention being restricted to the correctness of this assumption, that, as a result of the different layer thicknesses, associated with the different active composition contents, of the catalytically active composition in the individual zones, more preferably the decreasing layer thicknesses of the catalytically active composition from the first to the third zone, firstly the reaction of o-xylene up to PA in the first and, if appropriate, second zone is influenced, and additionally, in the third zone with the even thinner layer of active composition, the remaining under-oxidation products are oxidized, for example phthalide to PA, but not PA to the over-oxidation products, for example $CO_x$. As a result, over the entire structured packing, the maximum productivity for the oxidation of o-xylene to PA is achieved at a minimum proportion of the undesired by-products.

In a preferred inventive embodiment, the BET surface area increases from the first catalyst zone disposed toward the gas inlet side to the third catalyst zone disposed toward the gas outlet side. Preferred ranges for the BET surface area are 15 to 25 $m^2/g$ for the first catalyst zone, 15 to 25 $m^2/g$ for the second catalyst zone and 25 to 45 $m^2/g$ for the third catalyst zone.

In general, it is preferred in accordance with the invention that the BET surface area of the first catalyst zone is lower than the BET surface area of the third catalyst zone. Particularly advantageous catalysts are also obtained when the BET surface areas of the first and of the second catalyst zone are the same, while the BET surface area of the third catalyst zone is greater in comparison. The catalyst activity toward the gas inlet side, in a preferred inventive embodiment, is lower than the catalyst activity toward the gas outlet side.

In principle, in addition to the $TiO_2$ defined in detail herein, there may also be a blend with another titanium dioxide of another specification, i.e. another BET surface area, porosimetry and/or particle size distribution. However, it is preferred in accordance with the invention that at least 50%, in particular at least 75%, more preferably all, of the $TiO_2$ used has a BET surface area and porosimetry as defined herein, and preferably also has the particle size distribution described. It is also possible to use blends of different $TiO_2$ materials.

It has also been found that, in a preferred embodiment, in accordance with the invention, catalysts which do not have any phosphorus in the catalytically active composition, in combination with the $TiO_2$ used in accordance with the invention, enable particularly good activities with simultaneously very high selectivity. It is further preferred that at least 0.05% by weight of the catalytically active composition is formed by at least one alkali metal calculated as alkali metal(s). The alkali metal used is more preferably caesium.

In addition, according to the inventor's results, in one embodiment, it is preferred that the inventive catalyst contains niobium in an amount of from 0.01 to 2% by weight, in particular from 0.5 to 1% by weight, of the catalytically active composition.

The inventive catalysts are typically thermally treated or calcined (conditioned) before use. It has been found to be advantageous when the catalyst is calcined in an $O_2$-containing gas, in particular in air, at at least 390° C. for at least 24 hours, in particular at at least 400° C. for between 24 and 72 hours. The temperatures should preferably not exceed about 500° C., in particular about 470° C. However, other calcination conditions which appear suitable to those skilled in the art are not fundamentally ruled out.

In a further aspect, the present invention relates to a process for preparing a catalyst according to one of the preceding claims, comprising the following steps:
a. providing a catalytically active composition as defined herein, comprising the $TiO_2$ characterized in detail above;
b. providing an inert support, in particular an inert shaped support body;
c. applying the catalytically active composition to the inert support, in particular in a fluidized bed.

In a further aspect, the present invention also relates to the use of titanium dioxide as defined above for preparing a catalyst, in particular for the gas phase oxidation of hydrocarbons, preferably for the gas phase oxidation of o-xylene and/or naphthalene to phthalic anhydride.

Methods

To determine the parameters of the inventive catalysts, the methods which follow are used:

1. BET Surface Area:

The determination is effected by the BET method according to DIN 66131; a publication of the BET method can also be found in J. Am. Chem. Soc. 60, 309 (1938).

2. Pore Radius Distribution:

The pore radius distribution and the pore volume of the $TiO_2$ used were determined by means of mercury porosimetry to DIN 66133; maximum pressure: 2000 bar, Porosimeter 4000 (from Porotec, Germany), according to the manufacturer's instructions.

3. Primary Crystal Sizes:

The primary crystal sizes (primary particle sizes) were determined by powder X-ray diffractometry. The analysis was carried out with an instrument from Bruker, Germany: BRUKER AXS-D4 Endeavor. The resulting X-ray diffractograms were recorded with the "DiffracPlus D4 Measurement" software package according to the manufacturer's instructions, and the half-height width of the 100% reflection was evaluated with the "DiffracPlus Evaluation" software by the Debye-Scherrer formula according to the manufacturer's instructions in order to determine the primary crystal size.

4. Particle Sizes:

The particle sizes were determined by the laser diffraction method with a Fritsch Particle Sizer Analysette 22 Economy (from Fritsch, Germany) according to the manufacturer's instructions, also with regard to the sample pretreatment: the sample is homogenized in deionized water without addition of assistants and treated with ultrasound for 5 minutes.

5. Bulk Density:

The bulk density was determined with the aid of the $TiO_2$ used to prepare the catalyst (dried at 150° C. under reduced pressure, uncalcined). The resulting values from three determinations were averaged.

The bulk density was determined by introducing 100 g of the $TiO_2$ material into a 1000 ml container and shaken for approx. 30 seconds (if required, several parallel batches).

A measuring cylinder (capacity precisely 100 ml) is weighed empty to 10 mg. Above it, the powder funnel is secured over the opening of the cylinder using a clamp stand and clamp. After the stopwatch has been started, the measuring cylinder is charged with the $TiO_2$ material within 15 seconds. The spatula is used to constantly supply more filling material, so that the measuring cylinder is always slightly overfilled. After 2 minutes, the spatula is used to level off the excess, care being taken that no pressing forces compress the material in the cylinder. The filled measuring cylinder is brushed off and weighed.

The bulk density is reported in g/ml.

The BET surface area, the pore radius distribution and the pore volume, and also the primary crystal sizes and the particle size distribution were determined for the titanium dioxide in each case on the uncalcined material dried at 150° C. under reduced pressure.

The data in the present description with regard to the BET surface areas of the catalysts or catalyst zones also relate to the BET surface areas of the $TiO_2$ material used in each case (dried at 150° C. under reduced pressure, uncalcined, see above).

In general, the BET surface area of the catalyst is determined by virtue of the BET surface area of the $TiO_2$ used, although the addition of further catalytically active components does change the BET surface area to a certain extent. This is familiar to those skilled in the art.

The active composition content (content of the catalytically active composition, without binder) relates in each case to the content (in % by weight) of the catalytically active composition in the total weight of the catalyst including support in the particular catalyst zone, measured after conditioning at 400° C. over 4 h.

The invention will now be illustrated in detail with reference to the nonrestrictive examples which follow:

EXAMPLES

Example 1

Preparation of Catalyst A (Comparison)

To prepare catalyst A having an active composition content of 8% by weight and the composition of 7.5% by weight of vanadium pentoxide, 3.2% by weight of antimony trioxide, 0.40% by weight of caesium (calculated as caesium), 0.2% by weight of phosphorus (calculated as phosphorus) and remainder titanium dioxide, 2600 g of steatite bodies in the form of hollow cylinders of size 8×6×5 mm were coated at a temperature of 70° C. in a fluidized bed coater with a suspension of 17.9 g of vanadium pentoxide, 7.6 g of antimony trioxide, 1.28 g of caesium sulphate, 1.9 g of ammonium dihydrogenphosphate, 364.4 g of titanium dioxide, 130.5 g of binder composed of a 50% dispersion of water and vinyl acetate/ethylene copolymer (Vinnapas® EP 65 W, from Wacker) and 1000 g of water. The active composition was applied in the form of thin layers.

The titanium dioxide had a BET surface area of 26 $m^2/g$, a bulk density of 1.23 g/ml, a primary crystal size of 20 ångstrøm, a pore radius distribution of
  50% of the total pore volume by pores having a radius of 7500 to 400 nm
  1.7% of the total pore volume by pores having a radius of 400 to 60 nm
  48% of the total pore volume by pores having a radius of 60 to 3.7 nm,
and a particle size distribution of
$d_{10}$=12.4 µm
$d_{50}$=31.6 µm
$d_{90}$=64.7 µm.

Example 2

Preparation of Catalyst B (Inventive)

To prepare catalyst B having an active composition content of 8% by weight and the composition of 7.5% by weight of vanadium pentoxide, 3.2% by weight of antimony trioxide, 0.40% by weight of caesium (calculated as caesium), 0.2% by weight of phosphorus (calculated as phosphorus) and remainder titanium dioxide, 2200 g of steatite bodies in the form of hollow cylinders of size 8×6×5 mm were coated at a temperature of 70° C. in a fluidized bed coater with a suspension of 15.1 g of vanadium pentoxide, 6.4 g of antimony trioxide, 1.08 g of caesium carbonate, 1.5 g of ammonium dihydrogenphosphate, 178.62 g of titanium dioxide, 130.5 g of binder (see Example 1) and 2000 g of water. The active composition was applied in the form of thin layers.

The titanium dioxide had a BET surface area of 17 $m^2/g$, a bulk density of 0.48 g/ml, a primary crystal size of 31 ångstrøm, a pore radius distribution of
  19% of the total pore volume by pores having a radius of 7500 to 400 nm
  66% of the total pore volume by pores having a radius of 400 to 60 nm
  15% of the total pore volume by pores having a radius of 60 to 3.7 nm,
and a particle size distribution of
$d_{10}$=0.34 µm
$d_{50}$=1.14 µm
$d_{90}$=3.4 µm.

Example 3

Preparation of Catalyst C (Inventive)

To prepare catalyst C having an active composition content of 8% by weight and the composition of 8.2% by weight of vanadium pentoxide, 3.2% by weight of antimony trioxide, 0.40% by weight of caesium (calculated as caesium), 0.2% by weight of phosphorus (calculated as phosphorus) and remainder titanium dioxide, 2000 g of steatite bodies in the form of hollow cylinders of size 8×6×5 mm were coated at a temperature of 70° C. in a fluidized bed coater with a suspension of 17 g of vanadium pentoxide, 7.03 g of antimony trioxide, 1.14 g of caesium sulphate, 1.7 g of ammonium dihydrogenphosphate, 195.0 g of titanium dioxide, 130.5 g of binder (see Example 1) and 2000 g of water. The active composition was applied in the form of thin layers.

The titanium dioxide had a BET surface area of 23 $m^2/g$, a bulk density of 0.52 g/ml, a primary crystal size of 27 ångstrøm, a pore radius distribution of
  23% of the total pore volume by pores having a radius of 7500 to 400 nm
  60% of the total pore volume by pores having a radius of 400 to 60 nm
  16% of the total pore volume by pores having a radius of 60 to 3.7 nm,
and a particle size distribution of
$d_{10}$=0.4 µm
$d_{50}$=1.2 µm
$d_{90}$=3.1 µm.

Example 4

Determination of the Catalytic Performance Data of Catalyst A

A 120 cm-long reaction tube having an internal diameter of 24.8 mm is charged to a length of 80 cm with 40 g of catalyst A, diluted with 200 g of steatite rings of dimensions 8×6×5 mm to prevent hotspots. The reaction tube is disposed in a liquid salt melt which can be heated to temperatures up to 450° C. In the catalyst bed is disposed a 3 mm protective tube with incorporated thermoelement which can be used to indicate the catalyst temperature over the complete catalyst combination. To determine the catalytic performance data, 60 g/m³ (STP) of o-xylene (purity 99.9%) are passed over the catalyst A at a maximum of 400 l (STP) of air/h, so that a catalyst composition-based space velocity of 5.12 1/h×m$_{cat}$ is established at an average catalyst temperature of 420° C., and the reaction gas is analysed for its constituents downstream of the reaction tube exit. The results of the test run are listed in Table 1.

Example 5

Determination of the Catalytic Performance Data of Catalyst B (Inventive)

A 120 cm-long reaction tube having an internal diameter of 24.8 mm is charged to a length of 80 cm with 40 g of catalyst B, diluted with 200 g of steatite rings of dimensions 8×6×5 mm to prevent hotspots. Otherwise, the procedure is as described under Example 4. The results of the test run are listed in Table 1.

Example 6

Determination of the Catalytic Performance Data of Catalyst C (Inventive)

A 120 cm-long reaction tube having an internal diameter of 24.8 mm is charged to a length of 80 cm with 40 g of catalyst B, diluted with 218 g of steatite rings of dimensions 8×6×5 mm to prevent hotspots. Otherwise, the procedure is as described under Example 4. The results of the test run are listed in Table 1.

TABLE 1

List of the experimental results

| Example | Conversion [%] | C$_8$ selectivity [mol %] | PA selectivity [mol %] | CO$_x$ selectivity [mol %] |
|---|---|---|---|---|
| Catalyst A (Ex. 4) | 26 | 55.7 | 32.2 | 39.1 |
| Catalyst B (Ex. 5) | 69.5 | 85.5 | 67.7 | 11.7 |
| Catalyst C (Ex. 6) | 95.4 | 85.3 | 81.7 | 12.3 |

C$_8$ selectivity: selectivity for all products of value having 8 carbon atoms (phthalic anhydride, phthalide, o-tolylaldehyde, o-toluic acid)
CO$_x$: sum of carbon monoxide and dioxide in the offgas stream Example 7

Preparation of an Inventive Three-layer Catalyst

An inventive three-layer catalyst can be obtained, for example, as follows:

To prepare a catalyst D having an active composition content of 9% by weight and the composition of 7.5% by weight of vanadium pentoxide, 3.2% by weight of antimony trioxide, 0.40% by weight of caesium (calculated as caesium), 0.2% by weight of phosphorus (calculated as phosphorus) and remainder titanium dioxide, 2000 g of steatite bodies in the form of hollow cylinders of size 8×6×5 mm were coated at a temperature of 70° C. in a fluidized bed coater with a suspension of 17.0 g of vanadium pentoxide, 7.0 g of antimony trioxide, 1.1 g of caesium sulphate, 1.65 g of ammonium dihydrogenphosphate, 194.9 g of titanium dioxide having a BET surface area of 21 m²/g, 102.1 g of binder composed of a 50% dispersion of water and vinyl acetate/ethylene copolymer (Vinnapas® EP 65 W, from Wacker) and 2000 g of water. The active composition was applied in the form of thin layers.

To prepare a catalyst E having an active composition content of 8% by weight and the composition of 7.5% by weight of vanadium pentoxide, 3.2% by weight of antimony trioxide, 0.20% by weight of caesium (calculated as caesium), 0.2% by weight of phosphorus (calculated as phosphorus) and remainder titanium dioxide, 2000 g of steatite bodies in the form of hollow cylinders of size 8×6×5 mm were coated at a temperature of 70° C. in a fluidized bed coater with a suspension of 15.1 g of vanadium pentoxide, 6.3 g of antimony trioxide, 0.53 g of caesium sulphate, 1.47 g of ammonium dihydrogenphosphate, 173.7 g of titanium dioxide having a BET surface area of 21 m²/g, 101 g of binder composed of a 50% dispersion of water and vinyl acetate/ethylene copolymer (vinnapas® EP 65 W, from Wacker) and 2000 g of water. The active composition was applied in the form of thin layers.

To prepare a catalyst F having an active composition content of 8% by weight and the composition of 7.5% by weight of vanadium pentoxide, 3.2% by weight of antimony trioxide, 0.2% by weight of phosphorus (calculated as phosphorus) and remainder titanium dioxide, 2000 g of steatite bodies in the form of hollow cylinders of size 8×6×5 mm were coated at a temperature of 70° C. in a fluidized bed coater with a suspension of 15.1 g of vanadium pentoxide, 6.25 g of antimony trioxide, 1.47 g of ammonium dihydrogenphosphate, 174.11 g of titanium dioxide having a BET surface area of 27 m²/g, 101 g of binder composed of a 50% dispersion of water and vinyl acetate/ethylene copolymer (Vinnapas® EP 65 W, from Wacker) and 2000 g of water. The active composition was applied in the form of thin layers. The bulk densities for catalysts D, E and F were each below 0.5 g/ml, the primary crystal size somewhat above 30 ångstrøm; at least 25% of the total pore volume is formed by pores having a radius between 60 and 400 nm.

The sequence of the catalyst zones: 140 cm of catalyst D, 60 cm of catalyst E, 90 cm of catalyst F.

Example 8

Catalytic Performance Data of the Inventive Three-layer Catalyst

A 450 cm-long reaction tube is charged successively with 90 cm of catalyst F, 60 cm of catalyst E and 140 cm of catalyst D. The reaction tube is disposed in a liquid salt melt which can be heated to temperatures up to 450° C. In the catalyst bed is disposed a 3 mm protective tube with incorporated thermoelement, which can be used to indicate the catalyst temperature over the complete catalyst combination. To determine the catalytic performance data, from 0 to a maximum of 70 g/m³ (STP) of o-xylene (purity 99.9%) are passed over this catalyst combination in the sequence DEF at 3.6 m³ (STP) of air/h, and the reaction gas, downstream of the reaction tube exit, is passed through a condenser in which all organic constituents of the reaction gas apart from carbon monoxide and carbon dioxide are deposited. The deposited crude product is melted off by means of superheated steam, collected and subsequently weighed. The crude yield is determined as follows.

Max. crude PA yield [% by weight]=Weighed amount of crude PA[g]×100/feed of o-xylene [g]×purity of o-xylene [%/100]

The results of the test run are listed in Table 2.

TABLE 2

| Example | Maximum loading | Crude PA yield | PA quality (phthalide value in the reaction gas) | Hotspot temperature and position |
|---|---|---|---|---|
| Example 8: Catalyst combination D (140 cm) E (60 cm) F (90 cm) | 57 g/m³ (STP) | 113.8% by wt. | <500 ppm | 440° C. 50 cm (1st zone) |

As can be seen from Table 2, the inventive catalyst according to Example 8 exhibits a very good PA yield and PA quality. The hotspot is advantageously positioned in the first catalyst zone.

The invention claimed is:

1. A catalyst for the preparation of phthalic anhydride by gas phase oxidation of o-xylene or naphthalene, having an inert support and at least one layer which has been applied thereto which has a catalytically active composition comprising $TiO_2$, characterized in that at least a portion of the $TiO_2$ used has the following properties: (a) a BET surface area of more than 15 m²/g, (b) at least 25% of the total pore volume is formed by pores having a radius between 60 and 400 nm, and (c) a primary crystal size of more than 22 ångstrøm, wherein the $D_{90}$ value of the $TiO_2$ is between about 0.5 and 20 μm.

2. The catalyst according to claim 1, characterized in that its bulk density is less than 1.0 g/ml.

3. The catalyst according to claim 1, characterized in that the primary particle size of the $TiO_2$ is more than 25 ångstrøm.

4. The catalyst according to claim 1, characterized in that the BET surface area of the $TiO_2$ is between about 15 and 60 m²/g.

5. The catalyst according to claim 1, characterized in that at least 40%, of the total pore volume of the $TiO_2$ is formed by pores having a radius between 60 and 400 nm.

6. The catalyst according to claim 1, characterized that up to 70%, of the total pore volume of the $TiO_2$ is formed by pores having a radius between 60 and 400 nm.

7. The catalyst according to claim 1, characterized in that the catalytically active composition is applied in a fluidized bed.

8. The catalyst according to claim 1, characterized in that less than about 30%, of the total pore volume is formed by pores having a radius of more than 400 nm.

9. The catalyst according to claim 1, characterized in that about 17 to 27% of the total pore volume is formed by pores having a radius of more than 400 nm.

10. The catalyst according to claim 1, characterized in that about 50 to 70%, of the total pore volume is formed by pores having a radius of 60 to 400 nm.

11. The catalyst according to claim 1, characterized in that less than 30%, of the total pore volume is formed by pores having a radius of 3.7 to 60 nm.

12. The catalyst according to claim 1, characterized in that about 10 to 30% of the total pore volume is formed by pores having a radius of 3.7 to 60 nm.

13. The catalyst according to claim 1, wherein the $D_{90}$ value of the $TiO_2$ is between about 1 and 10 μm.

14. The catalyst according to claim 1, characterized in that less than 10%, of the total pore volume is formed by micropores having a pore radius of less than 3.7 nm.

15. The catalyst according to claim 1, characterized in that 8% by weight or more of the catalytically active composition, comprises vanadium, calculated as vanadium pentoxide.

16. The catalyst according to claim 1, characterized in that at least 0.05% by weight of the catalytically active composition comprises at least one alkali metal, calculated as an alkali metal.

17. The catalyst according to claim 1 further comprising an adhesive used for forming the catalytically active composition comprising an organic polymer or copolymer.

18. The catalyst according to claim 1, characterized in that the catalyst is calcined or conditioned in an $0_2$-containing gas at a temperature >390 ° C. for at least 24 hours.

19. The catalyst according to claim 1 further comprising niobium in an amount of 0.1 to 2% by weight.

20. The catalyst according to claim 1, characterized in that only one $TiO_2$ source is used.

21. The catalyst according to claim 1, characterized in that no phosphorus is present.

22. The catalyst according to claim 1, further comprising a first catalyst zone disposed toward a gas inlet side, a second catalyst zone disposed toward a gas outlet side and a third catalyst zone disposed even closer to or at the gas outlet side, wherein the catalyst zones comprise catalysts having different compositions yet each having an active composition comprising $TiO_2$, wherein the active composition content decreases from the catalysts of the first to the third catalyst zone, with the proviso that
 a) the catalyst of the first catalyst zone has an active composition content between about 7 and 12% by weight,
 b) the catalyst of the second catalyst zone has an active composition content in the range between 6 and 11% by weight, wherein the active composition content of the catalyst of the second catalyst zone is less than or equal to the active composition content of the catalyst of the first catalyst zone, and
 c) the catalyst of the third catalyst zone has an active composition content in the range between 5 and 10% by weight, wherein the active composition content of the catalyst of the third catalyst zone is less than or equal to the active composition content of the catalyst of the second catalyst zone.

23. The catalyst according to claim 22, characterized in that the first catalyst zone has an active composition content between about 8 and 11% by weight.

24. The catalyst according to claim 22, characterized in that the second catalyst zone has an active composition content between about 7 and 10% by weight.

25. The catalyst according to claim 22, characterized in that the third catalyst zone has an active composition content between about 6 and 9% by weight.

26. The catalyst according to claim 22, characterized in that the catalyst activity of the catalyst zone toward the gas inlet side is lower than the catalyst activity of the catalyst zone toward the gas outlet side.

27. The catalyst according to claim 22, characterized in that the BET surface area of the catalyst of the first catalyst zone is lower than the BET surface area of the catalyst of the third catalyst zone.

28. The catalyst according to claim 22, characterized in that the BET surface area of the catalyst of the first and of the second catalyst zone are the same, while the BET surface area of the catalyst of the third catalyst zone is greater in comparison.

29. The catalyst according to claim 22, characterized in that the BET surface area of the catalyst of the first and the second catalyst zone is between about 15 and 25 m²/g, and the BET surface area of the catalysts of the third catalyst zone is between about 25 and 45 m²/g.

30. The catalyst according to claim 22, characterized in that the catalysts of the first catalyst zone disposed toward the gas inlet side has a length fraction, based on the total length of the catalyst bed, of at least 40%.

31. The catalyst according to claim 22, characterized in that the proportion of the length of the first catalyst zone to the total length of the catalyst bed is between 40 and 70%.

32. The catalyst according to claim 22, characterized in that the proportion of the length of the second catalyst zone to the total length of the catalyst bed is between about 10 and 40%.

33. The catalyst according to claim 22, characterized in that the ratio of the length of the third catalyst zone to the length of the second catalyst zone is between about 1 and 2.

34. A process for preparing a catalyst for the preparation of phthalic anhydride by gas phase oxidation of o-xylene or naphthalene, comprising the following steps:
   a. providing a catalytically active composition comprising at least $TiO_2$, as defined in claim 1,
   b. providing an inert support,
   c. applying the catalytically active composition to the inert support in a fluidized bed.

35. A process for the gas phase oxidation of o-xylene or naphthalene to phthalic anhydride, comprising passing a feed stream comprising o-xylene or naphthalene over a catalyst comprising the catalytically active composition of claim 1.

36. The process of claim 35, characterized in that the titanium dioxide has a bulk density of less than 1.0 g/ml.

37. The process according to claim 35, characterized in that the titanium dioxide has a primary crystal size of more than 25 ångstrøm.

\* \* \* \* \*

UNITED STATES PATENT AND TRADEMARK OFFICE
CERTIFICATE OF CORRECTION

| | | |
|---|---|---|
| PATENT NO. | : 8,097,558 B2 | Page 1 of 1 |
| APPLICATION NO. | : 11/597495 | |
| DATED | : January 17, 2012 | |
| INVENTOR(S) | : Marvin Estenfelder, Helmut Hartsberger and Christian Gückel | |

It is certified that error appears in the above-identified patent and that said Letters Patent is hereby corrected as shown below:

On the Title page, Item (75), "Grafting" should be --Grafing--.

Signed and Sealed this
Twenty-fifth Day of September, 2012

David J. Kappos
*Director of the United States Patent and Trademark Office*